A. McKEOWN.
CURRYCOMB.
APPLICATION FILED SEPT. 13, 1913.
1,180,781.
Patented Apr. 25, 1916.
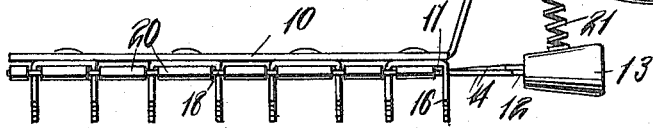
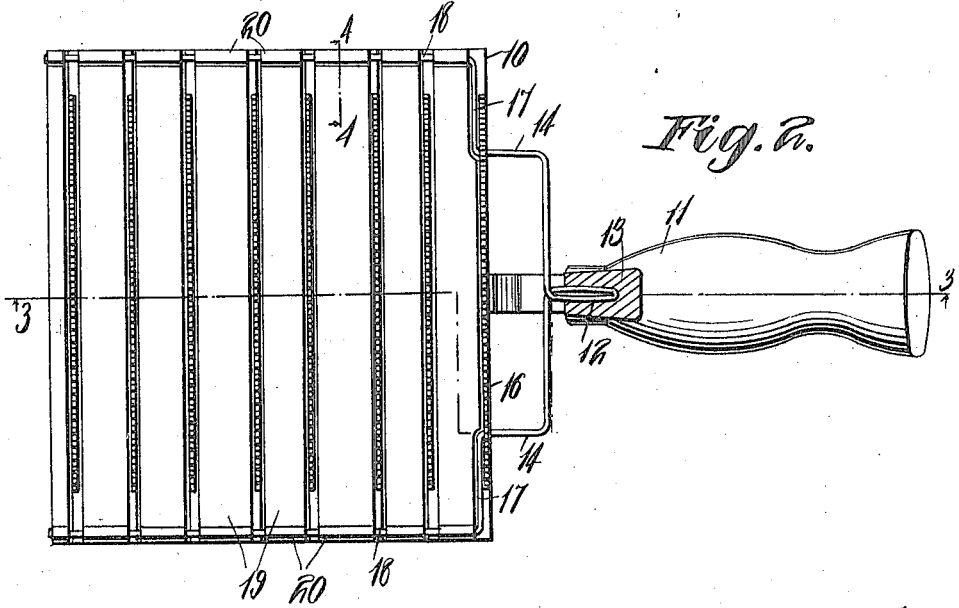
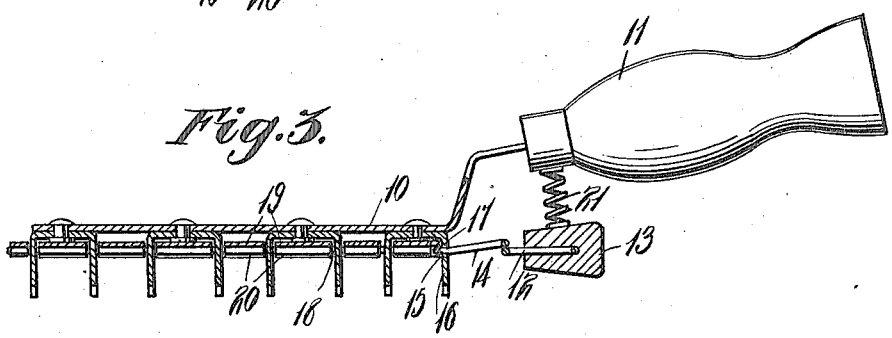
Inventor
A. McKeown,

UNITED STATES PATENT OFFICE.

ANDREW McKEOWN, OF GRAMPIAN, PENNSYLVANIA.

CURRYCOMB.

1,180,781.   Specification of Letters Patent.   Patented Apr. 25, 1916.

Application filed September 13, 1913. Serial No. 789,686.

*To all whom it may concern:*

Be it known that I, ANDREW MCKEOWN, a citizen of the United States, residing at Grampian, in the county of Clearfield, State of Pennsylvania, have invented certain new and useful Improvements in Currycombs; and I do hereby declare the following to be a full, clear, and exact description of the invention, such as will enable others skilled in the art to which it appertains to make and use the same.

This invention relates to curry combs and has for an object to provide an extremely simple teeth cleaning device which may be readily operated to remove hair which may become matted on the curry comb teeth.

A further object is to provide a curry comb having a teeth cleaner in the nature of a scraper which is formed of but two pieces, a wire frame and cross scraper bars connecting the sides of the frame being included in the structure, the frame having the rear end portion passed through suitable openings in the rear tooth bar of the curry comb to pivotally connect the scraper to the curry comb.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention:—Figure 1 is a side elevation of my improved curry comb. Fig. 2 is an underneath plan view. Fig. 3 is a longitudinal sectional view on the line 3—3 Fig. 2. Fig. 4 is a cross sectional view on the line 4—4 Fig. 2, showing the manner of securing the scraper bars to the sides of the frame.

Referring now to the drawing in which like characters of reference designate similar parts, 10 designates an ordinary curry comb having a manipulating handle 11.

The scraper comprises a frame formed from a single length of wire bent centrally upon itself to provide a closed loop 12 upon which a grip 13 is slipped, the terminals being directed forwardly in spaced parallel relation as shown at 14 and passed through suitable openings 15 in the rear tooth 16 of the curry comb, the terminals thence being directed laterally in opposite directions along the inner face of the rear tooth as shown at 17 and thence bent forwardly in spaced parallel relation as shown at 18 to extend along the side edges of the bottom face of the curry comb outside of the curry comb teeth. A plurality of flat scraping blades are arranged transversely of the side portions 18 and 14 of the frame as shown at 19, each blade being terminally bent around the related side of the frame as shown at 20 to rigidly secure the blade in position. The blades are of sufficient width to bear upon the adjacent faces of the curry comb teeth as shown.

The grip 13 underlies the handle, and a helical spring 21 is interposed between the grip and the handle, this spring exerting a downward pressure upon the grip sufficient to hold the scraper normally bearing against the underneath face of the curry comb back where it offers no obstruction to the manipulation of the curry comb. When it is desired to remove matted hair from the curry comb teeth, the grip is pressed toward the handle against the tension of its spring with a resultant rocking of the frame past the toothed edges of the curry comb teeth whereby the blades scrape all of the hair from the teeth. Upon the grip being released the controlling spring will return the parts to normal position.

From the above description it will be seen that I have provided an extremely simple and inexpensive device of the class described which may be formed of a few parts that will not easily get out of order.

What is claimed, is:—

The combination with a curry comb including transverse tooth bars and a handle, of a scraper including a frame formed of a single length of wire having its central portion bent to provide a handle portion under said first handle, portions on each side of said handle portion pivotally passed through the rear tooth bar and then directed outwardly between it and the adjacent tooth bar and extended along the ends of the tooth bars, and scraper plates disposed between said tooth bars and secured at their ends to said extended portions.

In testimony whereof, I affix my signature, in the presence of two witnesses.

ANDREW McKEOWN.

Witnesses:
W. W. DALE,
CARL OLSON.

Copies of this patent may be obtained for five cents each, by addressing the "Commissioner of Patents, Washington, D. C."